US010236989B2

United States Patent
Zhang et al.

(10) Patent No.: US 10,236,989 B2
(45) Date of Patent: Mar. 19, 2019

(54) DATA TRANSPORT USING PAIRWISE OPTIMIZED MULTI-DIMENSIONAL CONSTELLATION WITH CLUSTERING

(71) Applicants: NEC Laboratories America, Inc., Princeton, NJ (US); NEC Corporation, Tokyo (JP)

(72) Inventors: Shaoliang Zhang, Princeton, NJ (US); Fatih Yaman, Princeton, NJ (US); Eduardo Mateo Rodriguez, Tokyo (JP); Yoshihisa Inada, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/729,021

(22) Filed: Oct. 10, 2017

(65) Prior Publication Data

US 2018/0102851 A1 Apr. 12, 2018

Related U.S. Application Data

(60) Provisional application No. 62/406,031, filed on Oct. 10, 2016.

(51) Int. Cl.
*H04B 10/54* (2013.01)
*H04Q 11/00* (2006.01)
(Continued)

(52) U.S. Cl.
CPC ... *H04B 10/5161* (2013.01); *H04B 10/07953* (2013.01); *H04B 10/532* (2013.01);
(Continued)

(58) Field of Classification Search
None
See application file for complete search history.

(56) References Cited

U.S. PATENT DOCUMENTS

2007/0036202 A1* 2/2007 Ge ............... H04B 1/71052
375/141
2011/0231016 A1* 9/2011 Goulding ............... G06N 3/008
700/246

(Continued)

OTHER PUBLICATIONS

Reimer, et al., "Optimized 4 and 8 Dimensional Modulation Formats for Variable Capacity in Optical Networks", Sep. 2016, 3 pages.

(Continued)

*Primary Examiner* — Darren E Wolf
(74) *Attorney, Agent, or Firm* — Joseph Kolodka

(57) ABSTRACT

Systems and methods for data transport in an optical communications system, including generating a pairwise optimized (PO) multi-dimensional signal constellation in a single stage. The PO multi-dimensional signal constellation is generated by selecting a pair of symbols from a received constellation with M symbols, defining and minimizing an objective function with one or more constraints to optimize the selected pair of symbols, and iteratively selecting and optimizing one or more different pairs of symbols from the received constellation until a threshold condition is reached. Neighbor symbols from the generated PO multi-dimensional signal constellation in each polarization are clustered to formulate a clustered PO multi-dimensional signal constellation, and data is modulated and transmitted in accordance with the clustered PO multi-dimensional signal constellation.

14 Claims, 8 Drawing Sheets

(51) Int. Cl.
  *H04B 10/079* (2013.01)
  *H04B 10/516* (2013.01)
  *H04B 10/532* (2013.01)

(52) U.S. Cl.
  CPC ....... *H04B 10/541* (2013.01); *H04Q 11/0066* (2013.01); *H04Q 2011/0049* (2013.01); *H04Q 2011/0083* (2013.01)

(56) References Cited

U.S. PATENT DOCUMENTS

2014/0140360 A1* 5/2014 Nikopour ................ H04J 13/00
   370/479
2016/0372128 A1* 12/2016 Baeckstroem .......... G10L 19/08

OTHER PUBLICATIONS

Moore, et al., "Pairwise Optimization of Modulation Constellations for Non-Uniform Sources", Can. J. Elect. Comput. Eng., Nov. 2009, pp. 167-177, vol. 34, No. 4.

* cited by examiner

DATA TRANSPORT USING PAIRWISE OPTIMIZED MULTI-DIMENSIONAL CONSTELLATION WITH CLUSTERING

RELATED APPLICATION INFORMATION

This application claims priority to U.S. Provisional Application No. 62/406,031, filed on Oct. 10, 1016, incorporated herein by reference herein its entirety.

BACKGROUND

Technical Field

The present invention relates to data transport, and more particularly to generating multi-dimensional signal constellations using pairwise optimization and clustering for data transport in optical communications systems.

Description of the Related Art

In optical communications systems, due to the limited signal-to-noise ratio (SNR) at each link, power efficient modulation formats have become an important research topic to improve transmission capacity. With the advent of digital coherent receivers and high-speed digital-to-analog converters (DAC), advanced modulation formats have been able to be generated and recovered to explore various dimensions of optical signals, including, for example, polarization, amplitude, and phase. Set-partitioning (SP) quadrature-amplitude modulation (QAM) together with square M-QAM formats have been proposed to bring granularity in spectral efficiency (SE) from 4 bits/symbol to 8 bits/symbol to maximize the transmission capacity. Their performance has been shown to be superior to time-hybrid counterparts at the same SE.

In two-dimensional (2D) space, various 8QAM formats have been studied to improve the receiver sensitivity through geometric shaping. By partitioning the 16QAM into four cosets, 6-dimensional coded-modulation (CM) 16-QAM has been proposed to improve the Euclidean distance by ~1.5 dB compared with star-8QAM format. Four-dimensional (4D) two amplitude 8-phase-shifted-keying (2A8PSK) has been shown to outperform star-8QAM format. Optimized constant-power 8QAM has also been studied by using pairwise optimization (PO) to achieve better receiver sensitivity than star-8QAM. However, M-QAM and SP-QAM formats have been found to perform worse than multi-dimensional modulation formats. The reasons are two-fold: SP-QAM formats at 5~7 bits/symbol do not have Gray-mapping encoding because the neighbors of each symbol outnumber the maximum number bits encoded, and their Euclidean distance is smaller than some optimized multi-dimensional formats.

SUMMARY

According to an aspect of the present principles, a method is provided for data transport in an optical communications system, including generating a pairwise optimized (PO) multi-dimensional signal constellation in a single stage. The PO multi-dimensional signal constellation is generated by selecting a pair of symbols from a received constellation with M symbols, defining and minimizing an objective function with one or more constraints to optimize the selected pair of symbols, and iteratively selecting and optimizing one or more different pairs of symbols from the received constellation until a threshold condition is reached. Neighbor symbols from the generated PO multi-dimensional signal constellation in each polarization are clustered to formulate a clustered PO multi-dimensional signal constellation, and data is modulated and transmitted in accordance with the clustered PO multi-dimensional signal constellation.

According to another aspect of the present principles, a system is provided for data transport in an optical communications system, including a transmitter for generating a pairwise optimized (PO) multi-dimensional signal constellation in a single stage. The PO multi-dimensional signal constellation is generated by selecting a pair of symbols from a received constellation with M symbols, defining and minimizing an objective function with one or more constraints to optimize the selected pair of symbols, and iteratively selecting and optimizing one or more different pairs of symbols from the received constellation until a threshold condition is reached. Neighbor symbols from the generated PO multi-dimensional signal constellation in each polarization are clustered to formulate a clustered PO multi-dimensional signal constellation, and data is modulated and transmitted in accordance with the clustered PO multi-dimensional signal constellation.

According to another aspect of the present principles, a system is provided for data transport in an optical communications system, including a receiver for decoding a received data stream transmitted in accordance with a clustered single stage pairwise optimized (PO) multi-dimensional signal constellation. The PO multi-dimensional signal constellation is generated by selecting a pair of symbols from a received constellation with M symbols, defining and minimizing an objective function with one or more constraints to optimize the selected pair of symbols, and iteratively selecting and optimizing one or more different pairs of symbols from the received constellation until a threshold condition is reached. Neighbor symbols from the generated PO multi-dimensional signal constellation in each polarization are clustered to formulate a clustered PO multi-dimensional signal constellation, and data is modulated and transmitted in accordance with the clustered PO multi-dimensional signal constellation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
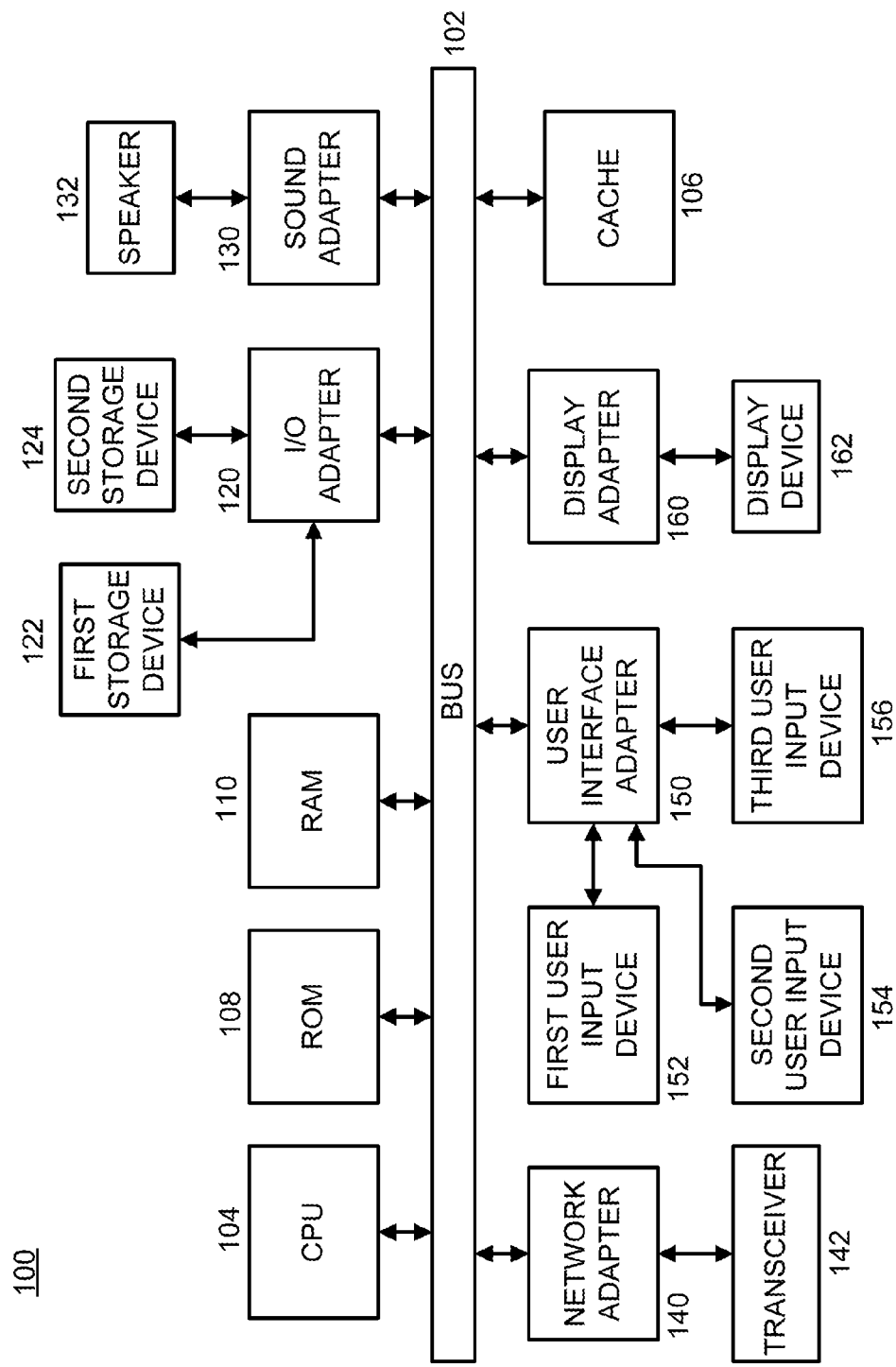
FIG. 1 is a block/flow diagram illustrating an exemplary processing system to which the present principles may be applied, in accordance with the present principles.

In accordance with the present principles, systems and methods are provided for generating multi-dimensional signal constellations using pairwise optimization and clustering for data transport in optical communications systems.

In one embodiment, an optical communications system, providing improved receiver sensitivity over conventional systems by optimizing constellations in multi-dimensional space using a universal Pairwise Optimization (PO) method, is illustratively depicted in accordance with the present principles. In contrast to conventional PO systems and methods for non-uniform signal sources, the present invention employs a single-stage PO method including introducing a novel objective function to analytically estimate the bit error rate (BER) of the given symbols and bit mapping with uniform signaling. In addition, a clustering method may be utilized to simplify the generation of optimized multi-dimensional constellation with trivial performance loss in accordance with various embodiments. In one embodiment, the multi-dimensional PO method in accordance with the present principles improves the performance of constellation formats with 5~7 bits/symbol at all the signal-to-noise rates (SNRs) of interest.

In one embodiment, the PO method in accordance with the present principles is performed using a single-stage optimization objective function for multi-dimensional constellations, thus making it both universal and less complex than conventional PO methods. The resulting multi-dimensional signal achieves better receiver sensitivity than conventional QAM formats. The multi-dimensional PO method, which may employ a computer optimization toolbox in accordance with various embodiments, is faster and more effective than conventional PO methods by using computer optimization toolbox. In addition, the clustering method according to the present principles enables grouping of some constellation points together with minimal performance degradation, and thus reduces the required effective number of bits in the transmitter and the complexity of digital signal processing (DSP) algorithms in the receiver in accordance with various embodiments.

In one embodiment, the multi-dimensional PO algorithm includes only a single-stage to optimize the constellation by minimizing the BER of any given constellation with specified bits mapping. This algorithm is universal, and thus, may be applied for any dimensional constellation in accordance with various embodiments. The clustering algorithm to the multi-dimensional constellation is applicable for reducing the complexity of signal generation and DSP recovery. The novel 4D-8QAM constellation generated in accordance with the present principles provides performance improvements over conventional standard modulation formats by more than 0.5 dB at all SNRs of interest because of, for example, because of optimization of both Euclidean distance and bits mapping in accordance with the present principles.

In one embodiment, the method according to the present principles is general and simpler than that of conventional system and methods, as the determined objective function minimizes the BER of optimized constellation in one step rather than requiring multiple steps/iterations, which is an ultimate goal for the constellation optimization. The optimization according to the present principles is blind optimization (e.g., without having prior knowledge of the optimized constellations), and the clustering algorithm using K-nearest neighbors simplifies the generation of the multi-dimensional constellation in accordance with various embodiments.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Referring now in detail to the figures in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 600 and 800 described below with respect to FIGS. 6 and 8, respectively, are systems for implementing respective embodiments of the present principles. Part or all of processing system 100 may be implemented in one or more of the elements of systems 600 and 800 of FIGS. 6 and 8, respectively.

Figure 2:
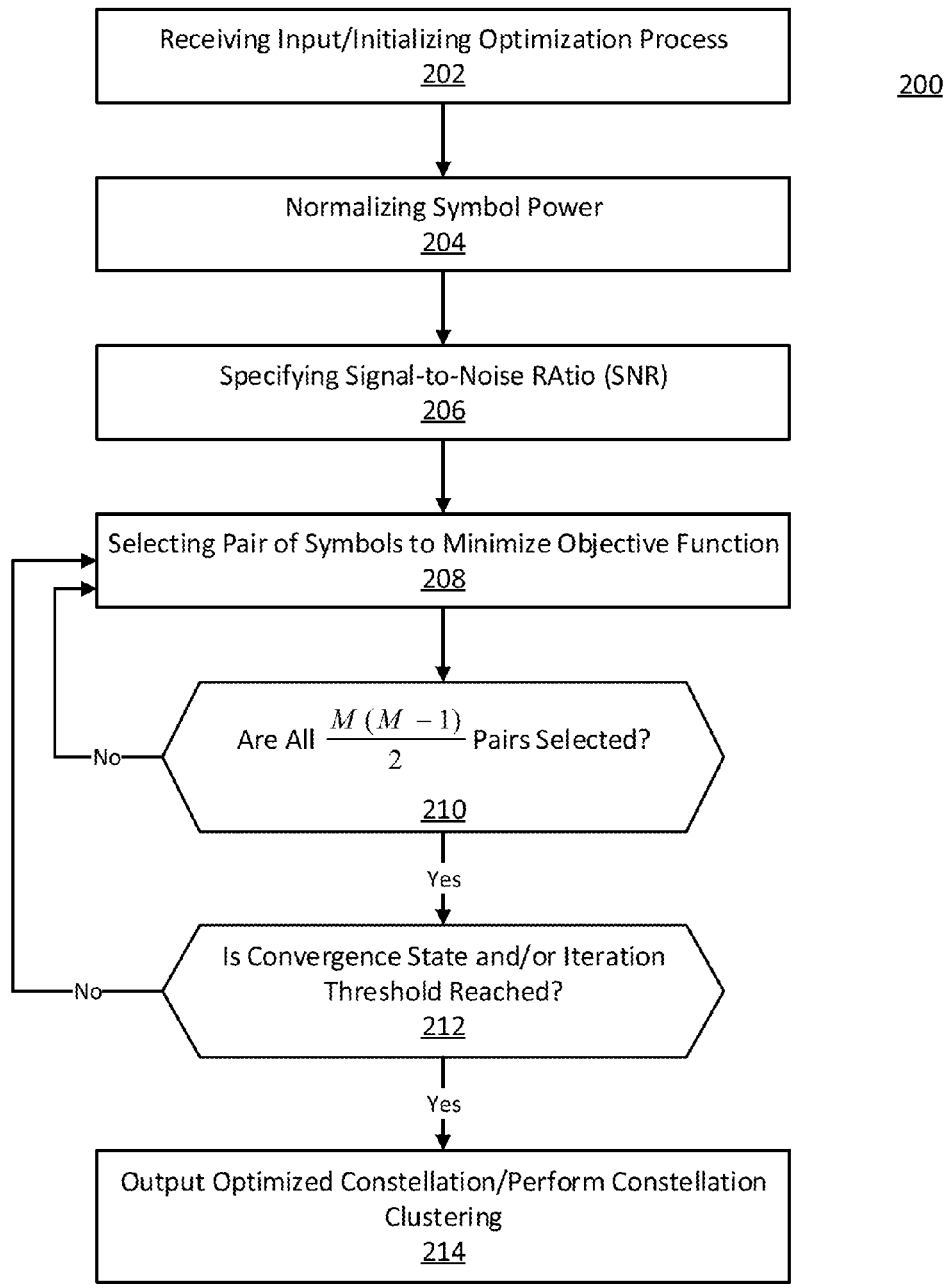
FIG. 2 is a block/flow diagram illustrating a method for generating a single-stage pairwise optimized multi-dimensional constellation for data transport, in accordance with the present principles.
Figure 5:
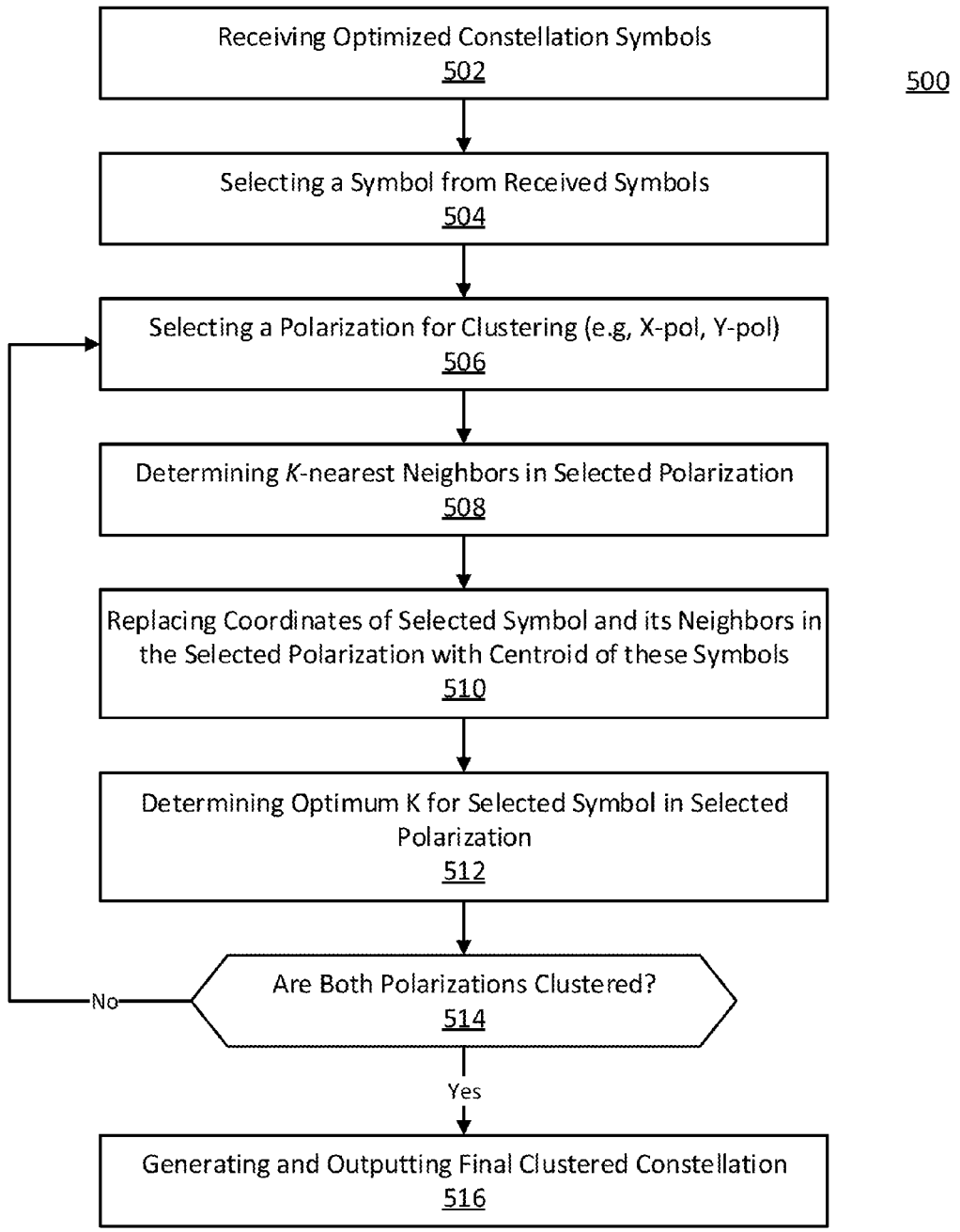
FIG. 5 is a block/flow diagram illustrating a method for clustering multi-dimensional constellations for data transport, in accordance with the present principles.
Figure 7:
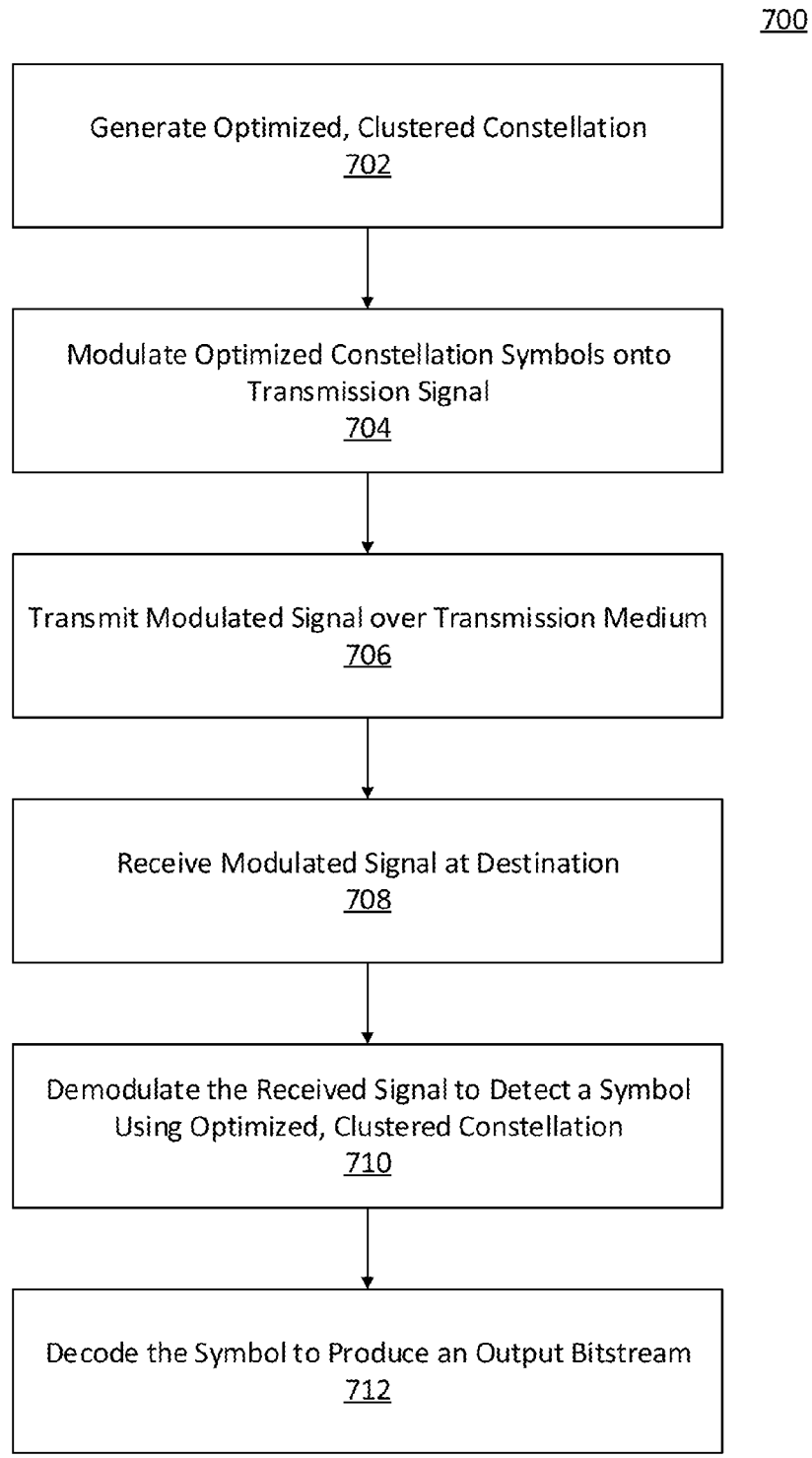
FIG. 7 is a block/flow diagram illustrating a high-level method for optical communication using a single-stage pairwise optimized multi-dimensional constellation with clustering, in accordance with the present principles.

Further, it is to be appreciated that processing system 100 may perform at least part of the method described herein including, for example, at least part of methods 200, 500, and 700 of FIGS. 2, 5, and 7, respectively. Similarly, part or all of systems 600 and 800 may be used to perform at least part of methods 200, 500, and 700 of FIGS. 2, 5, and 7, respectively.

Referring now to FIG. 2, a method 200 for generating a single-stage pairwise optimized multi-dimensional constellation for data transport, is illustratively depicted in accordance with an embodiment of the present principles.

In one embodiment, in block 202, to initialize the single-stage multi-dimensional Pairwise Optimized algorithm, any N-dimensional constellation with M symbols $s=\{s_1, s_2, \ldots, s_M\}$ can be used together with a fixed bit mapping $\beta=\{\beta_1, \beta_2, \ldots, \beta_M\}$. M may be set to a power of 2 to have integer number of bits per symbol for easier encoding/decoding, and symbols s are N×1 vectors. The given constellation symbols s may be normalized so that the symbol power has a unit average power $E\{s\}=$in block 204, and the level of signal-to-noise ratio (SNR) ($\gamma$) may be specified for analytically calculating the BER in block 206 to optimize the constellation. As a result, the noise variance in each dimension amounts to $N_0=1/(N\gamma)$ in accordance with various embodiments of the present principles.

In block 208, an objective function may be defined together with some constraints, described in further detail hereinbelow, to generate optimum constellations, and pairs of symbols $\{s_i, s_j\}$ may be selected from M symbols to minimize the objective function $f(s,\gamma,\beta)$ in accordance with the present principles. A goal of the optimized constellation is to reduce the bit error rate (BER) at the given SNR. In one embodiment, rather than using time-consuming, and processor/resource intensive Monte-Carlo (MC) simulations, as in conventional systems and methods, novel analytical BER equations, as shown in Equation (1), below, may be utilized to facilitate and perform the optimization process. In plain words, the analytical BER may be determined by adding up the product of Hamming distance between two encoded bits and symbol error rate (SER) for all the pairs of symbols.

In one embodiment, the accuracy of this analytical BER may be checked against a BER simulated from MC simulations for one or more different 4D constellation formats. There are two observations from the comparison. First, the analytical BER has a very tight upper bound to the MC BERs at moderate and high SNR. Furthermore, the analytical BER preserves the performance difference between different formats, thus making the objective function accurately reflect the performance cons/pros of each constellation in accordance with various embodiments of the present principles.

After fixing the objective function, some constraints may be formulated and introduced to facilitate the optimization process. In one embodiment, for illustrative purposes, there may be assumed to include two basic constraints: zero mean and unit power constraints. Zero mean removes the bias of the constellation to maximize Euclidean distance under the unit power constraints. As a result, the optimization process can be represented as follows:

$$\text{minimize} \sum_{i=1}^{M} \sum_{j=i+1}^{M} h(\beta_i, \beta_j) \cdot Q\left(\frac{\|s_i - s_j\|}{\sqrt{4N_0/N}}\right) \quad (1)$$

$$\text{subject to} \sum_{i=1}^{M} s_i = 0, \text{ and } \sum_{i=1}^{M} \|s_i\|^2 = M \quad (2)$$

In the PO method, any pair $(s_i, s_j)$ of M constellation symbols, both the zero mean and average power constraints (Equation (2)) can be rewritten as:

$$s_i = -b - s_j, \quad (3)$$

$$\left\| s_j + \frac{b}{2} \right\|^2 = \frac{M-d}{2} - \frac{\|b\|^2}{4}, \quad (4)$$

where $b = \sum_{k=1, k \neq i, k \neq j}^{M} s_i$, and $d = \sum_{k=1, k \neq i, k \neq j}^{M} \|s_i\|^2$.

In one embodiment, the minimization of the objective function (Equation (2)) is simplified into finding $s_j$ on a hypersphere centered at $-b/2$ with a radius given by the square root of the right-hand side of Equation (4). Note that Equation (3) may define the relationship between $s_i$ and $s_j$, and Equation (4) may reduce the optimization dimension space of $s_j$ to N−1 instead of N. In practice, additional constraints can be added into the PO method (e.g., constant symbol power, $\|s_j\|=1$, $i \in \{1, 2, \ldots, M\}$) in accordance with various embodiments. The PO method according to the present principles is configured to be general, and thus may be applied to cover all potential local or global minimums in accordance with various embodiments.

After performing optimization on the pair $(s_i, s_j)$ using the established objective function and constraints in block 208, the method may proceed to a next pair in block 104 (e.g. $(s_i, s_{j+1})$), to continue the optimization process until iterating over all the $$\frac{M(M-1)}{2}$$

pairs of M constellation symbols. If all the $$\frac{M(M-1)}{2}$$

pairs are determined to be selected in block 104, the method proceeds to block 212 to determine whether a threshold condition has been met (e.g., reached performance limit, maximum pre-defined iterations, convergence state, etc.) If not all $$\frac{M(M-1)}{2}$$

pairs are determined to have been selected in block 210, the method returns to block 208, and the optimization process can start over by using the optimized constellation after the $$\frac{M(M-1)}{2}$$

iterations are complete.

In block 212, if the threshold condition has been met (e.g., reached performance limit, maximum pre-defined iterations, convergence state, etc.), the optimized constellation may be output in block 214, and constellation clustering may be performed in some embodiments, which will be described in further detail hereinbelow with reference to FIG. 5. If the threshold condition is determined to have not been met in block 212, then the method may iterate and return to block 208. The optimization process may continue until, for example, the convergence states or the maximum number of pre-defined iterations has been reached.

Figure 3:
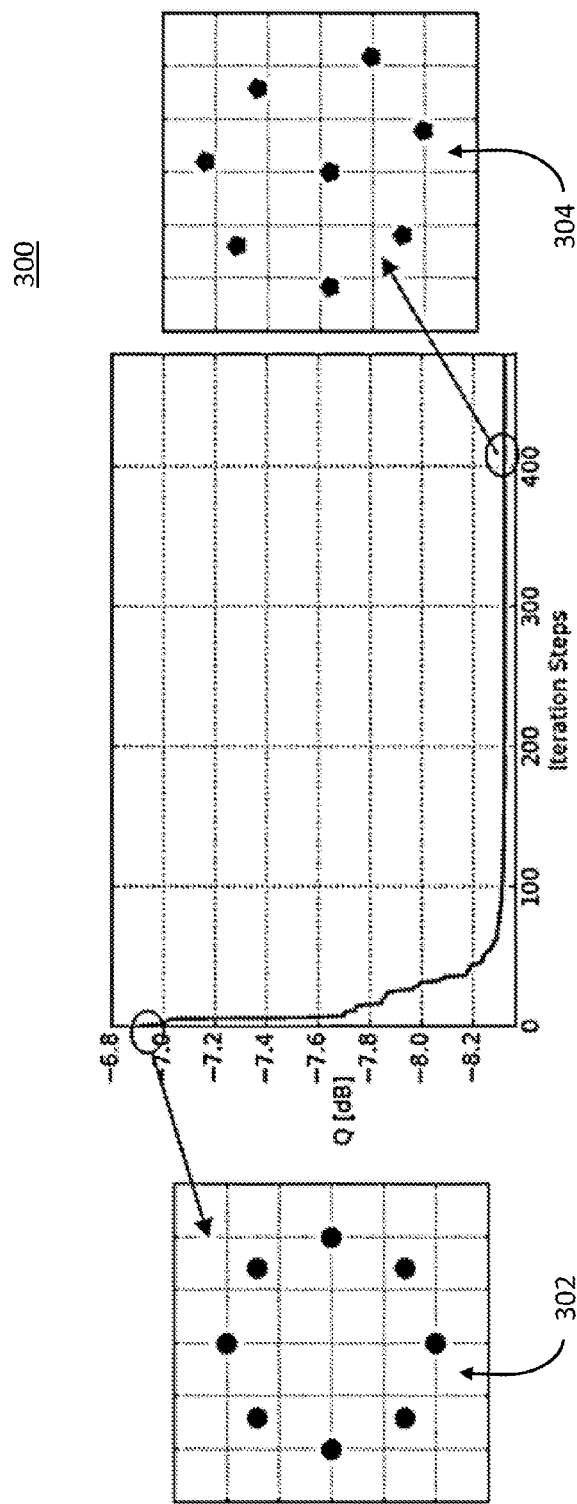
FIG. 3 is a graph illustrating an initial and a pairwise optimized 2-dimensional 8PSK constellation, in accordance with the present principles.

Referring now to FIG. 3, a graph 300 of an initial 302 and a pairwise optimized 304 2-dimensional (2D) 8-phase-shifted-keying (PSK) constellation is illustratively depicted in accordance with one embodiment of the present principles. The performance of the PO method according to the present principles may first be checked using a 2D-8PSK constellation, as shown in FIG. 3, where the Q-factor is calculated from the BER in the objective function (Equation (1)) multiplied with −1. As shown in FIG. 3, the cost function drops quickly after 50 steps to a convergence state. The optimized constellation is different than the original one, and improves the Q-factor by ~1.4 dB.

Figure 4:
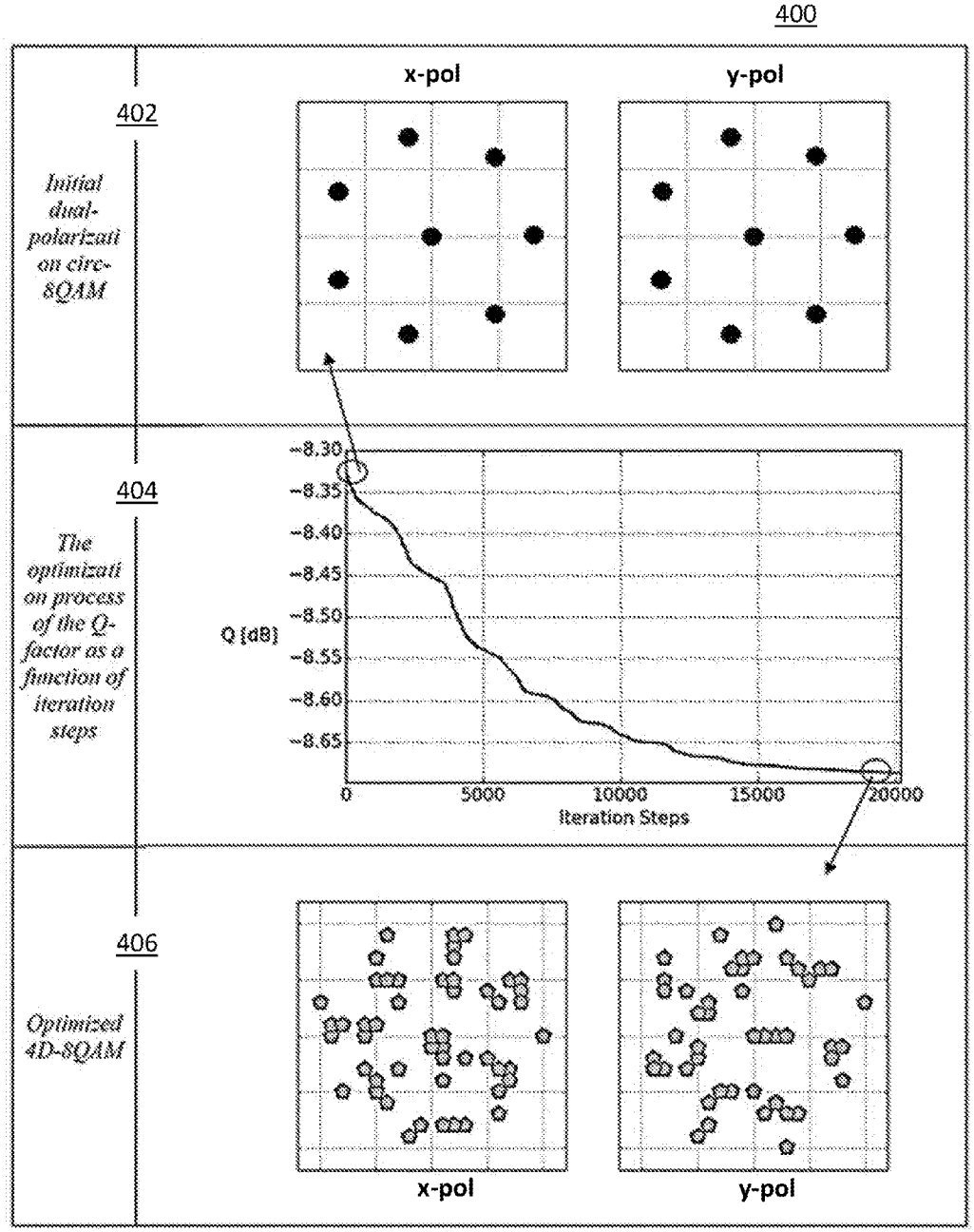
FIG. 4 is a graph illustrating generation of a single-stage pairwise optimized 4D-8QAM constellation for data transport, in accordance with the present principles.

Referring now to FIG. 4, a graph 400 illustrating generation of a single-stage pairwise optimized 4-dimensional (4D)-8QAM constellation for data transport is illustratively depicted in accordance with one embodiment of the present principles. As shown in FIG. 4, the PO method may be extended to 4-dimensional 8QAM format. Note that the PO method according to the present principles achieves at least a 0.3 dB improvement over the initial constellation 402, dual-polarization circle-8QAM.

The optimized 4D-8QAM constellation 406 may be more complicated than its initial constellation because of the optimization process 404, and this may increase the complexity of a digital signal processing (DSP) algorithm utilized to generate and recover the signal in accordance with the present principles. In one embodiment, to simply the constellation, a K-nearest neighbors (KNN) algorithm may be applied to the optimized 4D-8QAM constellation to cluster neighbor symbols in each polarization (e.g., x-pol, y-pol) while keeping the induced performance loss minimal. This clustering will be described in further detail hereinbelow with reference to FIG. 5.

Referring now to FIG. 5, a method 500 for clustering multi-dimensional constellations for data transport in optical communications systems is illustratively depicted in accordance with an embodiment of the present principles.

In one embodiment, N-dim bi-orthogonal formats v can be represented by the following vector $v=[0, \ldots, \pm 1, \ldots, 0]^T$. To cluster the constellation symbols, the optimized 4D constellation symbols may be received as input. In block 504, one of the M symbols may be selected to find its closest neighbor in either polarization (e.g., x-pol, y-pol), and a polarization for clustering is selected in block 506 in accordance with the present principles. The parameter K may be optimized such that the performance loss due to the clustering won't exceed a certain threshold (e.g., 0.2 dB Q). In block 508, the K-nearest neighbor symbols in one polarization, along with the selected symbol, are determined, and are grouped together by replacing their corresponding coordinates with their centroid in the same polarization in block 510.

In block 512, an optimum K may be determined for the selected symbol $s_i$ in the selected polarization such that the penalty of an estimated BER from the objective function is lower than a specified threshold ε in accordance with one embodiment. The estimated BER performance, as determined in block 512 may serve as a criteria for making a selection of K in the clustering method. If both x-polarization and y-polarizations are determined to have not been clustered in block 514, the steps 506, 508, 510, and 512 may be repeated for the other polarization. In practice, data transport using the clustered PO constellation generated in accordance with the present principles achieves data transmission in optical communications systems with only a trivial performance loss (e.g., <0.2 dB penalty at a high SNR), and thus improves the transmission speed and overall performance of optical communications systems in accordance with various embodiments.

Figure 6:
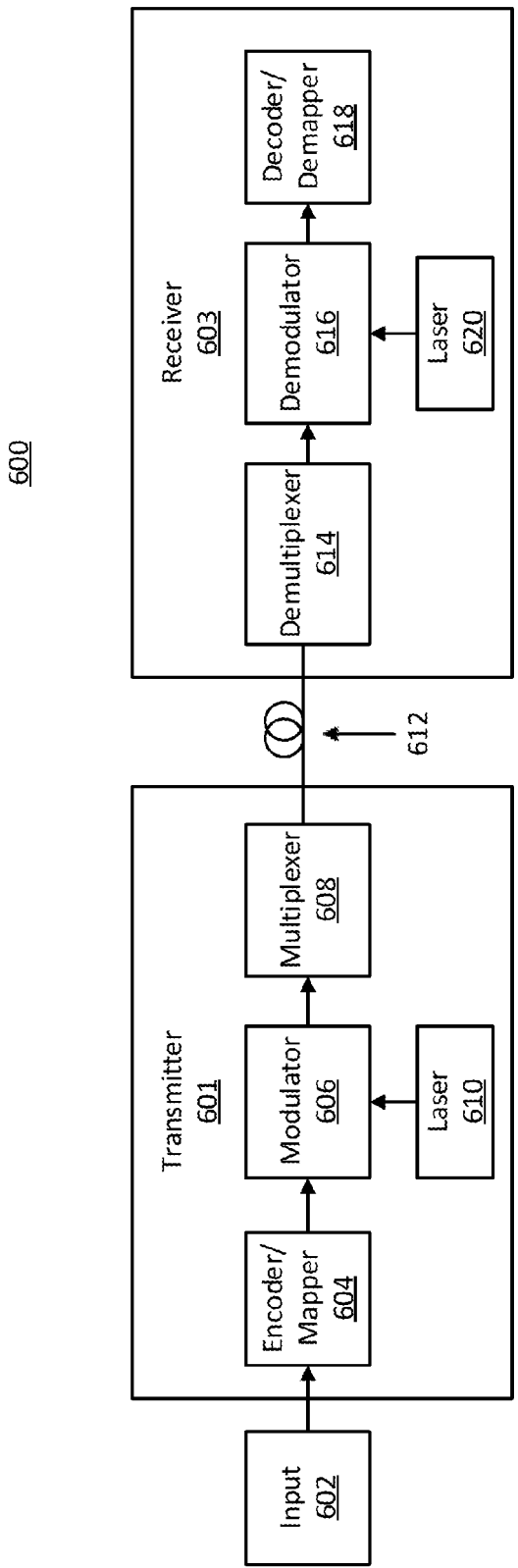
FIG. 6 is a block diagram illustrating a high-level system for data transport using a single-stage pairwise optimized multi-dimensional constellation with clustering, in accordance with the present principles.

Referring now to FIG. 6, a high-level system 600 for data transport using a clustered, pairwise optimized (PO) multi-dimensional constellation is illustratively depicted according to one embodiment of the present principles. In one embodiment, input data 602 may be received into a transmitter 601, and an incoming bit sequence may be coded into a symbol stream using one or more encoders/mappers 604. The encoders/mappers are further configured to map the data stream according to a clustered PO constellation generated in accordance with the present principles. The data stream may be modulated, using a modulator 606 (e.g., electro-optical modulator), and may be multiplexed using, for example, a polarization division multiplexer or mode-multiplexer in block 608. In some embodiments, the encoded signal may modulated onto a laser beam using a laser 610. The optically multiplexed signals may be transmitted over any of a plurality of transmission mediums 612 (e.g., SMF or FMF) in accordance with various embodiments of the present principles.

The transmitted signals may be received by a receiver 603, and in some embodiments, the receiver 603 may include a laser 620. In one embodiment, the signals may be demultiplexed using a mode demultiplexer 614 followed by, for example, a polarization diversity coherent detector (not shown). The signals may be demodulated using a demodulator 616, and may be decoded and demapped using one or more decoders/demappers 618. The decoding may continue until, for example, a valid codeword has been obtained or a predetermined (e.g., maximum) number of iterations has been reached in accordance with various embodiments of the present principles.

It is noted that although the above configuration is illustratively depicted according to the present principles, other configurations may also be employed for data transport utilizing the clustered PO constellation in accordance with various embodiments of the present principles.

Referring now to FIG. 7, a method 700 for data transport using a clustered pairwise optimized (PO) multi-dimensional constellation is illustratively depicted according to one embodiment of the present principles.

In block 702, an incoming bit sequence m coded into a symbol stream according to a clustered pairwise optimized (PO) multi-dimensional constellation generated in accordance with the present principles. In one embodiment, the optimized constellation is a clustered, pairwise optimized 4D-8QAM constellation generated in accordance with the present principles.

In block 704, the symbol stream may be modulated onto a transmission signal such as, e.g., a laser beam or another appropriate medium. In block 706, the modulated transmission signal may be transmitted using any of a plurality of transmission mediums, including, for example, a fiber optic cable.

In block 708, the modulated transmission signal is modulated from the transmission medium at the destination. In block 710, the modulated signal may be demodulated to detect the corresponding symbols using, for example, the same optimized, clustered constellation generated in block 702. In block 712, the symbols may be decoded into a corresponding bit sequence and the bit sequence may be output in accordance with various embodiments of the present principles.

Figure 8:
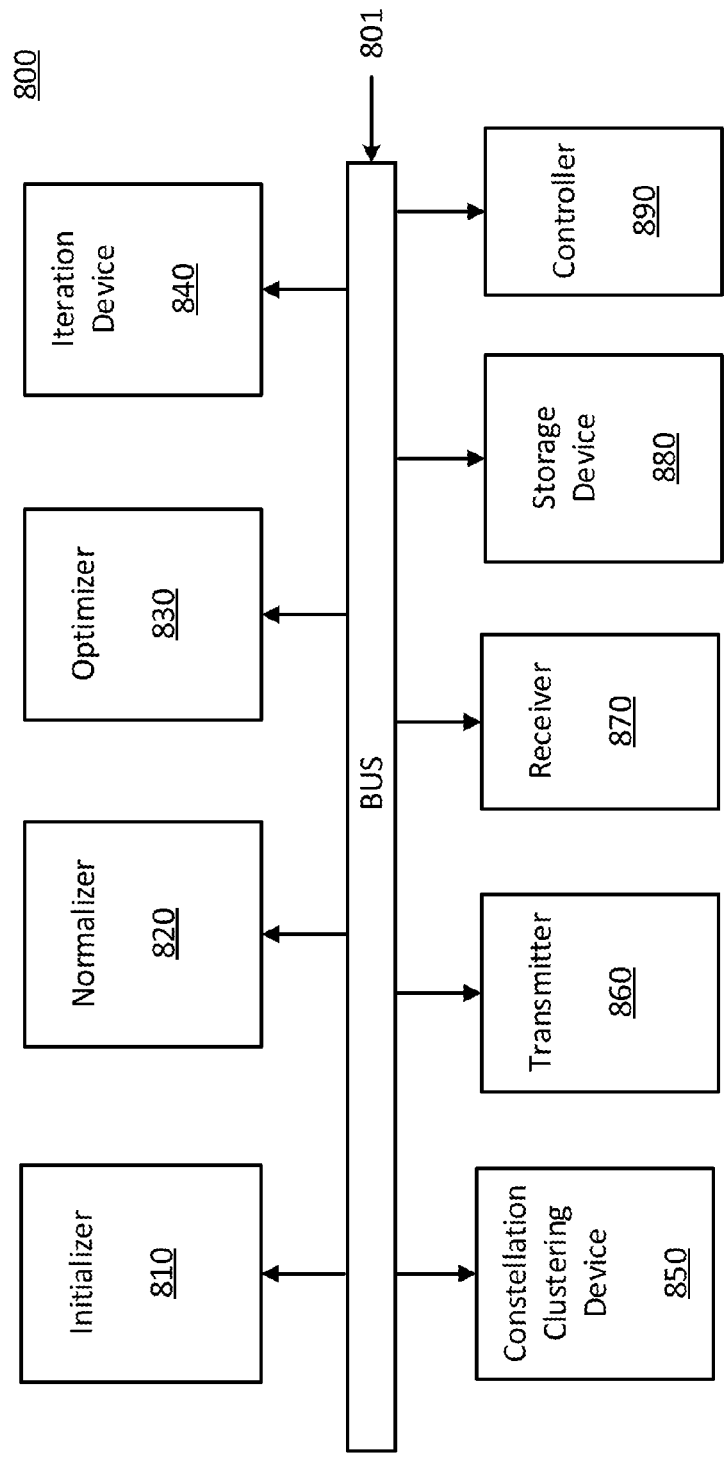
FIG. 8 is a block diagram illustrating a system for generating a single-stage pairwise optimized multi-dimensional constellation with clustering for data transport, in accordance with the present principles.

Referring now to FIG. 8, a system 800 for generating a pairwise optimized multi-dimensional constellation with clustering for data transport is illustratively depicted according to one embodiment of the present principles.

In one embodiment, the system 800 may include an initializer 810 for initializing an optimization process, a normalizer 820 for normalizing symbol power, an optimizer 830 for performing PO for one or more signal constellations, and an iterator 840 for continuing the optimization process until iterating over all $$\frac{M(M-1)}{2}$$

pairs of M constellation symbols until a threshold condition (e.g., convergence state, predetermined number of iterations, etc.) in accordance with the present principles. A constellation clustering device 850 may be employed to generate and output a final PO multi-dimensional clustered constellation, and data/signals may be sent using a transmitter 860 and received using a receiver 870 in accordance with the present principles. A storage device 880 may be employed to store, for example, program instructions, generated optimized constellations, etc., and a controller 890 may be employed to control/execute data transport over one or more transmission mediums (e.g., fiber optic cable) in accordance with various embodiments of the present principles.

In the embodiment shown in FIG. 8, the elements thereof are interconnected by a bus 801. However, in other embodiments, other types of connections can also be used. Moreover, in an embodiment, at least one of the elements of system 800 is processor-based and/or a logic circuit. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 800 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport in an optical communications system, comprising:
   generating a pairwise optimized (PO) multi-dimensional signal constellation in a single-stage, the generating comprising:

selecting a pair of symbols from a received constellation with M symbols;
defining and minimizing an objective function with one or more constraints to optimize the selected pair of symbols; the objective function and constraints are defined by the following objective function:

$$\sum_{i=1}^{M}\sum_{j=i+1}^{M} h(\beta_i, \beta_j) \cdot Q\left(\frac{\|s_i - s_j\|}{\sqrt{4N_0/N}}\right)$$

subject to the following constraints $$\sum_{i=1}^{M} s_i = 0; \text{ and}$$

$$\sum_{i=1}^{M} \|s_i\|^2 = M;$$

and iteratively selecting and optimizing one or more different pairs of symbols from the received constellation until a threshold condition is reached;
clustering neighbor symbols from the generated PO multi-dimensional signal constellation in each polarization to formulate a clustered PO multi-dimensional signal constellation; and
modulating and transmitting data in accordance with the clustered PO multi-dimensional signal constellation.

2. The method as recited in claim 1, further comprising normalizing the selected pairs of symbols into unit power, and specifying a level of signal-to-noise ratio (SNR) to calculate an initial bit-error-rate (BER).

3. The method as recited in claim 1, wherein the one or more constraints include zero mean and unit power constraints.

4. The method as recited in claim 1, wherein the pairwise optimized (PO) multi-dimensional signal constellation is a 4-dimensional-8-quadrature-amplitude modulation (4D-8QAM) signal constellation.

5. The method as recited in claim 1, wherein the neighbor symbols are K-nearest neighbors in a selected polarization, and coordinates of a selected symbol and its neighbors in the selected polarization are replaced with a centroid of the symbols.

6. The method as recited in claim 5, further comprising determining an optimum K for the selected symbol in the selected polarization such that a penalty of an estimated bit-error-rate (BER) from the objective function is lower than a specified threshold value.

7. A system for data transport in an optical communications system, comprising:
a transmitter, including a processor, the processor being configured for generating a pairwise optimized (PO) multi-dimensional signal constellation in a single-stage, the generating comprising:
selecting a pair of symbols from a received constellation with M symbols;
defining and minimizing an objective function with one or more constraints to optimize the selected pair of symbols; the objective function and constraints are defined by the following objective function:

$$\sum_{i=1}^{M}\sum_{j=i+1}^{M} h(\beta_i, \beta_j) \cdot Q\left(\frac{\|s_i - s_j\|}{\sqrt{4N_0/N}}\right)$$

subject to the following constraints $$\sum_{i=1}^{M} s_i = 0; \text{ and}$$

$$\sum_{i=1}^{M} \|s_i\|^2 = M;$$

and iteratively selecting and optimizing one or more different pairs of symbols from the received constellation until a threshold condition is reached;
clustering neighbor symbols from the generated PO multi-dimensional signal constellation in each polarization to formulate a clustered PO multi-dimensional signal constellation; and
modulating and transmitting data in accordance with the clustered PO multi-dimensional signal constellation.

8. The system as recited in claim 7, wherein the one or more constraints include zero mean and unit power constraints.

9. The system as recited in claim 7, wherein the pairwise optimized (PO) multi-dimensional signal constellation is a 4-dimensional-8-quadrature-amplitude modulation (4D-8QAM) signal constellation.

10. The system as recited in claim 7, wherein the neighbor symbols are K-nearest neighbors in a selected polarization, and coordinates of a selected symbol and its neighbors in the selected polarization are replaced with a centroid of the symbols.

11. A system for data transport in an optical communications system, comprising:
a receiver, including a processor, the processor being configured for decoding a received data stream in accordance with a clustered single stage pairwise optimized (PO) multi-dimensional signal constellation, the clustered PO multi-dimensional signal constellation being generated by:
selecting a pair of symbols from a received constellation with M symbols;
defining and minimizing an objective function with one or more constraints to optimize the selected pair of symbols; the objective function and constraints are defined by the following objective function:

$$\sum_{i=1}^{M}\sum_{j=i+1}^{M} h(\beta_i, \beta_j) \cdot Q\left(\frac{\|s_i - s_j\|}{\sqrt{4N_0/N}}\right)$$

subject to the following constraints $$\sum_{i=1}^{M} s_i = 0; \text{ and}$$

$$\sum_{i=1}^{M} \|s_i\|^2 = M;$$

and iteratively selecting and optimizing one or more different pairs of symbols from the received constellation until a threshold condition is reached; and clustering neighbor symbols from the generated PO multi-dimensional signal constellation in each polarization to formulate a clustered PO multi-dimensional signal constellation.

12. The system as recited in claim 11, wherein the one or more constraints include zero mean and unit power constraints.

13. The system as recited in claim 11, wherein the pairwise optimized (PO) multi-dimensional signal constellation is a 4-dimensional-8-quadrature-amplitude modulation (4D-8QAM) signal constellation.

14. The system as recited in claim 11, wherein the neighbor symbols are K-nearest neighbors in a selected polarization, and coordinates of a selected symbol and its neighbors in the selected polarization are replaced with a centroid of the symbols.

* * * * *